(12) United States Patent
Dombrovskis

(10) Patent No.: US 11,667,254 B2
(45) Date of Patent: Jun. 6, 2023

(54) TEMPORARY CUSTOMIZATION OF AN OPERATING CHARACTERISTIC OF A VEHICLE FEATURE

(71) Applicant: Ningbo Geely Automobile Research & Development Co., Ltd., Ningbo (CN)

(72) Inventor: Sergejs Dombrovskis, Hisings Backa (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 215 days.

(21) Appl. No.: 17/092,580

(22) Filed: Nov. 9, 2020

(65) Prior Publication Data

US 2021/0053515 A1 Feb. 25, 2021

Related U.S. Application Data

(63) Continuation of application No. PCT/CN2019/087070, filed on May 15, 2019.

(30) Foreign Application Priority Data

May 16, 2018 (EP) ..................... 18172710

(51) Int. Cl.
*B60R 16/037* (2006.01)
*B60W 50/08* (2020.01)

(52) U.S. Cl.
CPC ......... *B60R 16/037* (2013.01); *B60W 50/085* (2013.01); *B60W 2540/041* (2020.02); *B60W 2540/043* (2020.02); *B60W 2540/21* (2020.02)

(58) Field of Classification Search
None
See application file for complete search history.

(56) References Cited

U.S. PATENT DOCUMENTS

| | | | |
|---|---|---|---|
| 8,140,344 B2 | 3/2012 | Kameyama | |
| 9,533,640 B2 * | 1/2017 | Rai | B60W 40/08 |
| 9,758,116 B2 * | 9/2017 | Xiong | B60R 16/037 |
| 9,807,547 B1 | 10/2017 | Oesterling | |
| 9,916,071 B2 | 3/2018 | Penilla et al. | |
| 10,696,249 B2 * | 6/2020 | Heinrich | A61B 5/0205 |
| 2008/0112175 A1 | 5/2008 | Bucher | |
| 2010/0014711 A1 | 1/2010 | Camhi | |
| 2015/0053066 A1 | 2/2015 | Hampiholi | |
| 2019/0031187 A1 * | 1/2019 | Noguerol | B60W 10/22 |

FOREIGN PATENT DOCUMENTS

| | | |
|---|---|---|
| DE | 102012010890 A1 | 12/2013 |
| DE | 102015122600 A1 | 6/2017 |
| WO | 2016202431 A1 | 12/2016 |
| WO | 2017136725 A1 | 8/2017 |

OTHER PUBLICATIONS

International Search Report from corresponding International Application No. PCT/CN2019/087070, dated Aug. 14, 2019, 2 pages.

* cited by examiner

*Primary Examiner* — Todd Melton
(74) *Attorney, Agent, or Firm* — Tucker Ellis LLP

(57) ABSTRACT

A method for enabling a user to temporarily customize an operating characteristic of a first vehicle feature. The method includes temporarily customizing an operating characteristic of a first vehicle feature by means of the vehicle electronic control unit based on acquired personal information. The temporary customized operating characteristic of the first vehicle feature does not remain customized more than a single driving cycle.

11 Claims, 4 Drawing Sheets

TEMPORARY CUSTOMIZATION OF AN OPERATING CHARACTERISTIC OF A VEHICLE FEATURE

RELATED APPLICATION DATA

This application is a continuation of International Patent Application No. PCT/CN2019/087070, filed May 15, 2019, which claims the benefit of European Patent Application No. 18172710.8, filed May 16, 2018, the disclosures of which are incorporated herein by reference in their entireties.

TECHNICAL FIELD

The disclosure relates to a method and a system for enabling a user to temporarily customize an operating characteristic of a first vehicle feature associated with a vehicle welcome sequence.

The method and system of the disclosure can for example be implemented in a car or automobile, but the disclosure is not restricted to this particular vehicle and may alternatively be implemented in other type of vehicles such as minivans, recreational vehicles, off-road vehicles, trucks, buses or the like.

BACKGROUND

In the field of vehicles, there is an increasing demand for providing the user of the vehicle with a pleasant and enjoyable vehicle welcome sequence when user approaches and enters the vehicle. Several different vehicle features, such as for example vehicle interior lighting and graphical user interface on instrument cluster may be programmed to yield such pleasant and enjoyable vehicle welcome sequence to the user.

However, despite the activities in the field, there is a demand for an even more pleasant and enjoyable vehicle welcome sequence.

SUMMARY

This section provides a general summary of the disclosure, and is not a comprehensive disclosure of its full scope or all of its features.

A general object of the present disclosure is to provide a user-friendly, easily implemented and robust temporary customization of a vehicle welcome sequence for providing a pleasant and enjoyable vehicle environment to the user upon approaching, being located within and/or leaving the vehicle. Conventional vehicle features, such as for example those feature that may be associated with a vehicle welcoming sequence or those vehicle features that have larger influence on vehicle user well-being and comfort, are typically pre-programmed by the factory to provide the user with a pleasant and enjoyable environment.

Often, there is no possibility for a user to modify or individualise the welcome sequence. Consequently, the overall user experience must be toned down to suit most users equally well. However, such a general and toned down operating characteristic of the vehicle features prevents the user to exploit opportunities that could result in greater experiences to the user.

Moreover, even if the vehicle allows the user to adjust and individualise the settings of certain vehicles features, such as for example the vehicle features associated with a welcome sequences, such adjustment must generally be performed beforehand and they stay valid for as long as the setting is not actively changed by the user.

Consequently, the operating characteristics of conventional vehicles feature cannot be adapted in response to immediate user needs, and since there is no possibility to directly customize the operating characteristics a various vehicles features, such as for example those associated with a welcome sequence, the vehicle cannot exploit the opportunities to provide the user with greater experience.

It is therefore an object of the present disclosure is to provide a method and system that provides a user-friendly, easily implemented and robust temporary customization of a vehicle welcome sequence, thereby enabling a user to temporarily customize an operating characteristic of a first vehicle feature associated with a vehicle welcome sequence, such that the operating characteristics can be temporarily adapted and changed in response to immediate user needs.

Thereby, at least a first vehicle feature may, in connection with the user approaching the vehicle, be user-friendly, quickly, efficiently and reliably customized in conformity with the user's current emotional state, current need or purpose of the next trip, such that each opportunity for the user to have a greater experience is exploited, and such that an improved overall user experience is provided.

This and other objects, which will become apparent in the following, are at least partly accomplished by a method and system as defined in the accompanying independent claims.

According to a first aspect of the present disclosure, there is provided a method for enabling a user to temporarily customize an operating characteristic of a first vehicle feature associated with a vehicle welcome sequence. The method comprises, in connection with the user approaching the vehicle, the steps of:

acquiring personal information from the user indicating the user's emotional state or the user's current need or the user's purpose of the next trip by presenting an option list to the user by means of a communication interface that can communicate with a vehicle electronic control unit and subsequently registering the user's response to said option list by means of said communication interface, wherein each option of the option list is allocated a predetermined operating characteristic of the first vehicle feature, and wherein the communication interface is a mobile communication device, temporarily customizing the operating characteristic of the first vehicle feature by means of the vehicle electronic control unit based on the acquired personal information, wherein the temporary customized operating characteristic of the first vehicle feature does not remain customized more than a single driving cycle, and wherein the first vehicle feature is vehicle interior lighting, or vehicle exterior lighting, or graphical user interface on at least one electronic visual display, or vehicle interior fragrance diffuser, or music play list, or vehicle horn, or vehicle seat heating system, or vehicle steering wheel heating system, or vehicle glass heating system, or vehicle glass light transmission system, and after termination of the temporary customization controlling the temporary customized operating characteristic of the first vehicle feature to return to an ordinary operating characteristic of the first vehicle feature by means of the electronic control unit.

Moreover, the method further comprises the step of using the ordinary operating characteristic of the first vehicle feature if no personal information from the user indicating the user's emotional state or the user's current need or the user's purpose of the next trip is acquired in connection with the user approaching the vehicle.

According to a second aspect of the present disclosure, there is provided a system for enabling a user to temporarily customize an operating characteristic of a first vehicle feature associated with a vehicle welcome sequence. The system comprises a first vehicle feature, a vehicle electronic control unit and a mobile communication device with communication interface that can communicate with the vehicle electronic control unit. The communication interface is configured to, in connection with the user approaching the vehicle, acquire personal information from the user indicating the user's emotional state or the user's current need or the user's purpose of the next trip by presenting an option list to the user, and subsequently registering the user's response to said option list, wherein each option of the option list is allocated a predetermined operating characteristic of the first vehicle feature. Furthermore, the vehicle electronic control unit is configured to temporarily customize the operating characteristic of the first vehicle feature based on the acquired personal information, wherein the first vehicle feature is vehicle interior lighting, or vehicle exterior lighting, or graphical user interface on at least one electronic visual display, or vehicle interior fragrance diffuser, or music play list, or vehicle horn, or vehicle seat heating system, or vehicle steering wheel heating system, or vehicle glass heating system, or vehicle glass light transmission system, wherein the temporary customized operating characteristic of the first vehicle feature does not remain customized more than a single driving cycle. Moreover, the vehicle electronic control unit is configured to, after termination of the temporary customization, control the temporary customized operating characteristic of the first vehicle feature to return to an ordinary operating characteristic of the first vehicle feature. Finally, the vehicle electronic control unit is configured to use the ordinary operating characteristic of the first vehicle feature if no personal information from the user indicating the user's emotional state or the user's current need or the user's purpose of the next trip is acquired in connection with the user approaching the vehicle.

The method and system defined above enables a user to temporarily customize an operating characteristic of a first vehicle feature, such that the operating characteristics can be temporarily adapted and changed in response to immediate user needs, thereby providing an improved overall user experience. In other words, a user may in connection with the user approaching the vehicle adapt and adjust one or more vehicle features according to the current need or mood or desire of the user.

For example, the user may decide to temporarily modify the operating characteristics of the vehicle some internal and external lights, such that some internal and external lights being activated when the driver approaches and enters a vehicle, or such that the internal and external lights are activated differently than normal, i.e. according to the ordinary operating characteristic of the selected vehicle features.

Alternatively, the user could for example temporarily adjust the sound effect when the vehicle is unlocked, or the user may for example temporarily adjust and modify the start-up sequences in the vehicle displays and instruments according to the current need or planned travel route.

Personal information is acquired from a user indicating the user's emotional state or the user's current need or the user's purpose of the next trip by registering the user's response to an option list provided by the communication interface. This provides a quick, efficient, user-friendly and reliable approach for acquiring personal information, because registration of a user's selection of an option out of a set of options included in the option list is a relatively non-complex task that tend to provide an unambiguous indication of a user's currently desired adaptation of the vehicle welcome sequence. In other words, there is no need for complex and unreliable interpretation of the user's current mental condition based merely on for example a user's non-prompted visual and/or oral expressions, and registration of a user's selected option of a presented option-list provides an easily implemented, cost-effectively and reliable approach for acquiring the user's current mood or need.

The option list may for example by provided by producing a sound or statement by a loudspeaker of the communication interface, or by displaying the option list on a display of the communication interface. The step of acquiring personal information from a user may for example be performed by registering voice commands or voice information from the user. A microphone for recording such voice commands or voice information may for example be located on or near an exterior surface of the vehicle, in a key fob or in a mobile device carried by the user, such as a smartphone. Alternatively, the step of acquiring personal information from a user may for example be performed by registering input via a display or buttons of the communication interface. The display or buttons of the communication interface may for example be located on the key fob or on a mobile device carried by the user, such as a smartphone.

Further advantages are achieved by implementing one or several of the features of the dependent claims.

Examples of personal information from a user indicating the user's emotional state may for example be characterised by one or more of the following moods: "happy", "sad", "tired", "thrilled", "relaxed", "romantic", "annoyed", "stressed", "inspired", "cold", "warm", "backache", "buttock ache", etc. Furthermore, the personal information from a user indicating the user's current need may for example be characterised by one or more of the following needs: "quick arrival", "navigation assistance" or the like. Moreover, personal information from a user indicating the user's purpose of the next trip may for example be characterised by one or more of the following purposes: "business trip", "vacation trip", "shopping trip", "pleasure trip", or the like.

The method and system may have a certain number of predefined variations of the operating characteristic of the first vehicle feature, from which the vehicle electronic control unit may select for either temporarily customizing the operating characteristic of the first vehicle feature or for using a default operating characteristic of the first vehicle feature. For example, the vehicle electronic control unit may have access to a limited set of different graphical interfaces of the display(s) of the vehicle.

In case the personal information is acquired by having the user selecting an option out of a predefined option list of the communication interface, such as for example via an electronic display or one or more actuating buttons, the vehicle control unit may be programmed so that each option is associated with an individual predefined variation of the operating characteristic of the first vehicle feature.

In one example embodiment, the method and system comprises adapting the option list provided by the communication interface based on specific circumstances at or near the time point of presenting the option list to the user. This has the advantage of making the content of the option list more relevant to the user, and less generic to fit all circumstances. Thereby the method and system according to the disclosure can provide better, more user-friendly and effective temporary customization of the operating characteristic of the first vehicle feature and thereby by provide a better experience to the user.

In one example embodiment, the method and system comprises adapting the option list provided by the communication interface based on at least one of the following information sources:
 registered vehicle ambient environmental information,
 registered vehicle passenger compartment environmental information,
 environmental information at geographical position of the vehicle downloaded from an external provider,
 registered user input to a navigation system,
 registered geographical position of the vehicle,
 electronic calendar information of the user,
 current date,
 current time,
 personal information of the user.

The vehicle ambient environmental information, i.e. vehicle outside environmental information, such as vehicle ambient temperature, light conditions, rainfall, sunshine, air pressure, humidity, etc. may be useful information for providing more relevant options. For example, if the electronic control unit registers that it is dark outside when the user approaches the vehicle the communication interface may provide an option to the user to select "increased lighting" for temporarily increasing the vehicle outside and interior welcoming lighting to provide simplified and more welcoming entry to the vehicle. Thereby, a more user-friendly and efficient option list is provided, since the likelihood that at least one of the presented options corresponds to the user's emotional state or the user's current need or the user's purpose of the next trip is increased.

Alternatively, if the electronic control unit registers that it is relatively cold outside when the user approaches or has entered the vehicle the communication interface may provide an option to the user to select "Warming" for temporarily increasing the vehicle interior heating, such as seat and steering wheel heating, window heating, etc. to provide a more comfortable and welcoming entry to, and journey with, the vehicle.

Still more alternatively, if the electronic control unit registers that it is relatively sunny outside when the user approaches or has entered the vehicle the communication interface may provide an option to the user to select "Sunny" for temporarily increasing the vehicle interior air cooling, starting seat ventilators, increasing the light intensity of the graphical interface of the displays to make them more clear and readable, adjust a vehicle glass light transmission system for reducing sunshine inlet, etc. to provide a more comfortable and welcoming entry to, and journey with, the vehicle.

The vehicle passenger compartment environmental information, such as temperature, light conditions, air pressure, humidity, air smell, etc. may be useful information for providing more relevant options to the user. See for example the alternatives described above concerning ambient light conditions, temperature and sunshine, which are relevant also for vehicle passenger compartment environmental information in equal manner.

The vehicle environmental information at geographical position of the vehicle downloaded from an external provider may be used in a corresponding manner as the registered vehicle ambient environmental information described above.

The registered user input to a navigation system may be used for determining the type of travel the user is planning to perform and the electronic control unit may use this information for adapting the option list provided to the user. For example, if the user plans to take a short trip the electronic control unit may adapt the options accordingly.

The registered geographical position of the vehicle may for example be used for providing more relevant options for temporary customisation of a vehicle feature. For example, if the electronic control unit registers that the vehicle is located in a mountainous area, especially in the winter time, the vehicle communication interface may provide an option to the user to select "Winter" for temporarily reducing engine responsiveness, reducing maximal engine output power and/or adjust the gear shift map of an automatic transmission for reducing the risk for wheel slip.

With access to electronic calendar information of the user the electronic control unit may determine the purpose of the next trip with a certain degree of likelihood, and may adjust the options to the user provided by the vehicle communication interface accordingly. For example, if the next trip likely will be a business trip, the vehicle communication interface may provide an option to the user to select "Business", and if the user selects this option, at least one vehicle feature is temporarily adjusted accordingly. For example, a radio station sending economic news may be automatically selected and the interior lighting may be set more moderate and less playful.

The current date may be used as indicator of the type of travel, for example based on whether the travel is performed on a weekday or a weekend, or if the travel takes place during a public holiday. Moreover, the current time may be used for determining the ambient lighting conditions, i.e. whether it is dark or bright outside and in the vehicle, or whether the travel takes places in times of typical traffic congestion, and the electronic control unit may adjust and provide relevant options accordingly.

Personal information of the user may be used for providing more relevant options to the user for temporarily customizing a vehicle feature. For example, if it is the birthday of the user, the electric control unit may ask the user to select "Celebration" or the like, and the graphical interface of the displays may be adjusted to show flags or similar celebrating features and/or a special playlist may be automatically selected.

In one example embodiment, the method and system comprises adapting the option list provided by the communication interface based on a predictive statistical model of the user's behaviour. The predictive statistical model of the user's behaviour may for example indicate at what time the user typically drives from home to work, and back, each day of the week. Consequently, based on this information the electronic control unit may pose specially adapted options for temporarily customizing of a vehicle feature when the user approaches and starts a journey. The specially adapted options for temporarily customizing of a vehicle feature may further take into account the direction of the travel, e.g. to work or to home.

In one example embodiment, the method and system comprises acquiring information from a user indicating the user's emotional state or the user's current need or the user's purpose of the next trip by registering a user's voice command by means of voice recognition or user's text input in the communication interface.

The vehicle electronic control unit may include, or be connectable to a remote server having, an interpretation functionality that is configured to allocate the acquired personal information of the user with one of a set of predefined temporary variations of the operating characteristic of the first vehicle feature.

In other words, as an example, if the user orally states, or provides a text input stating, "calm dawn" the electronic control unit may submit this statement to the interpretation functionality, which after processing provides the instruction that the electronic control unit should select the predefined temporary variation of the operating characteristic of the first vehicle feature associated with "Stressed". The interpretation functionality thus here based on the input "calm down" determined that the user likely is stressed and requests a temporary calming down customization of the at least one vehicle feature.

Adaptation of the operating characteristics of a vehicle feature may for example be accomplished by voice control, wherein for example a key fob, a mobile device such as a smartphone of the user, or the vehicle itself registers the voice command of the user. Registering and interpretation of voice commands may thus be performed before, during or after the user enters the vehicle.

Similarly, registering and interpretation of a user's text input in the communication interface may typically be performed by means of an electronic display, such as the display of a mobile device or the display within the vehicle. Registering and interpretation of a user's text input may thus also be performed before, during or after the user enters the vehicle.

In one example embodiment, the method and system comprises providing the vehicle electronic control unit with access to a finite set of predetermined logic algorithms for controlling the first vehicle feature, wherein each logic algorithm represents an individual operating characteristic of the first vehicle feature, analysing the acquired personal information from the user and assigning the acquired personal information to one of the predetermined logic algorithms for controlling the first vehicle feature, and temporarily customizing the operating characteristic of the first vehicle feature by executing the assigned predetermined logic algorithms for controlling the first vehicle feature.

For example, if the first vehicle feature for example is exterior lighting of the vehicle door handle, for example by means of a LED installed in or nearby the door handle, a default predetermined logic algorithm for controlling the handle lighting may for example be switching on a fixed intensity white light upon vehicle unlocking and switching off upon door closure, a first customized predetermined logic algorithm for controlling the handle lighting may for example be switching on a gradually increasing and decreasing intensity with light upon vehicle unlocking and switching off upon door closure, and a second customized predetermined logic algorithm for controlling the handle lighting may for example be switching on a fixed intensity coloured lighting upon vehicle unlocking and switching off upon door closure. Depending on the acquired personal information from the user the electric control unit will subsequently select one of said predetermined logic algorithms for controlling the handle lighting and thereby temporarily customizing the operating characteristic of the handle lighting.

In one example embodiment, the temporarily customized operating characteristic of the first vehicle feature remain in a customized state during about 5-60 minutes starting from entering the customized state, or during about 5-15 minutes starting from entering the customized state, or until the end of the driving cycle. This clearly illustrates the temporary characteristic of the customization. This temporary characteristic ensures that the vehicle at start of each journey is operated using the predetermined default operating characteristic of the vehicle feature, unless the user or vehicle system decides to temporarily customize the vehicle feature. A driving cycle ends with the user leaving the vehicle and the vehicle becomes locked.

The first vehicle features that is temporarily customized belongs to a set of vehicle features that are associated with a vehicle welcome sequence. A vehicle welcome sequence is the special operating characteristic of various vehicles features that are performed in a time period associated with the user approaching, unlocking, opening and/or entering the vehicle. The vehicle welcome sequence may for example include special operating characteristic of the vehicle exterior and interior lighting, graphical interface of the vehicle displays and vehicle interior fragrance diffuser. After a certain time period after initiating the vehicle welcome sequence the operating characteristic s of the vehicle features included in the vehicle welcome sequence return to their default operating characteristics.

In one example embodiment, the method and system comprises acquiring information from the user about which vehicle seats should be included in temporary customization of the operating characteristic of the first vehicle feature. The user may be the driver of the vehicle or a passenger of the vehicle. If the user is a passenger and intends to sit in the front seat the temporary customization takes the seat location of the user into account when for example adjusting the operating characteristics of the seat heating, seat ventilation, seat massage system or the like that are specific to a certain seat.

In one example embodiment, the method and system comprises temporarily customizing an operating characteristic of also a second vehicle feature, specifically of also a second and a third vehicle feature, and more specifically of also a second, third and fourth vehicle feature, by means of the vehicle electronic control unit based on the acquired personal information, wherein the temporary customized operating characteristic of said vehicle features do not remain customized more than a single driving cycle, and after termination of the temporary customization controlling the temporary customized operating characteristic of said vehicle features to return to an ordinary operating characteristic of said vehicle feature by means of the electronic control unit. In other words, the temporary customization of may involve simultaneous customisation of a plurality vehicle features. Thereby, the experience for the user is further improved.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

The various example embodiments of the disclosure, including its particular features and example advantages, will be readily understood from the following illustrative and non-limiting detailed description and the accompanying drawings, in which.

DETAILED DESCRIPTION

Figure 1:
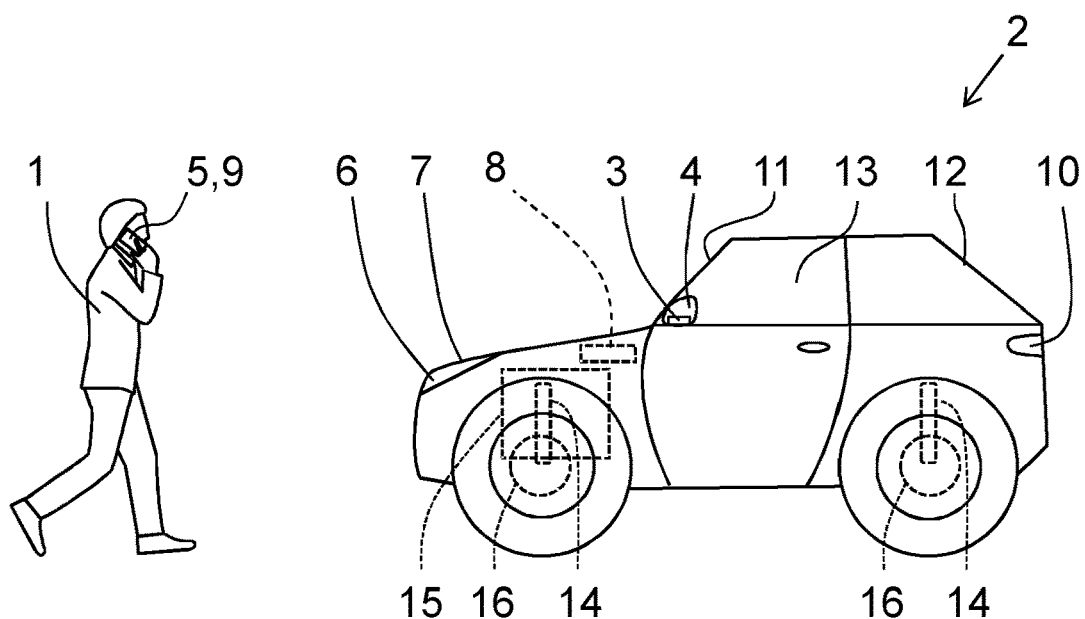
FIG. 1 is a schematic view of a user walking towards a vehicle while directly temporarily customizes the operating characteristics of a first vehicle via the mobile phone.

The present disclosure will now be described more fully hereinafter with reference to the accompanying drawings, in which exemplary embodiments of the disclosure are shown. The disclosure may, however, be embodied in many different forms and should not be construed as limited to the embodiments set forth herein; rather, these embodiments are provided for thoroughness and completeness. Like reference characters refer to like elements throughout the description. The drawings are not necessarily to scale and certain features may be exaggerated in order to better illustrate and explain the exemplary embodiments of the present disclosure.

Referring now to the figures and FIG. 1, there is schematically depicted an example embodiment of a system for enabling a user 1 to temporarily customize an operating characteristic of a first vehicle feature of a car 2 according to the disclosure. In this example embodiment, the first vehicle feature may be vehicle external proximity lighting for illuminating a proximity area surrounding the car, and a communication interface 9 implemented in a mobile phone of the user acquires personal information from the user 1 indicating that the user wants increased external lighting when the user approaches the car 2. As a result, an electronic control unit 8 of the system temporarily controls the external proximity lighting of the vehicle according to an alternative predetermined logic algorithm, different from an ordinary predetermined logic algorithm.

The external proximity lighting according to the alternative predetermined logic algorithm may for example be programmed to light-up and assist in welcoming and guiding an approaching user 1 of the car 2, assist the user 1 to open the car 2, and provide an illuminated surrounding for improved visibility and safety for the user 1 upon leaving the car 2.

The vehicle external proximity lighting may for example be activated when the car 2 is unlocked or upon detecting a user 1 approaching the car. Proximity detection of a user may be implemented in various ways, such as for example be registering the geographical positions of the car 2 and a mobile device 5 of the user 1, such as a mobile phone or a vehicle key fob, and calculate a distance therebetween. Alternatively, proximity detection of a user 1 may be detected detecting establishment of a short-range communication channel between a mobile device 5 of the user 1 and the car 2. The short-range communication channel may for example be based on a short-range wireless standard, such as Bluetooth, ZigBee, Wi-Fi, WiMax, or the like.

In the example embodiment of FIG. 1, the external proximity lighting includes a first light source 3 embedded in a side rear-view mirror 4 and a second light source 6 included in the front headlamps 7.

The system further comprises a vehicle electronic control unit 8 and a communication interface 9 that can communicate with the vehicle electronic control unit 8. In the example embodiment of FIG. 1, the mobile device 5 constitutes the communication interface 9.

The communication interface 9 is configured to, in connection with the user approaching the vehicle, acquire personal information from the user 1 indicating the user's emotional state or the user's current need or the user's purpose of the next trip.

Acquisition of personal information indicating the user's emotional state or the user's current need or the user's purpose of the next trip may be performed in many alternative manners. For example, the communication interface 9 may be configured to register the user's response to a question provided by communication interface 9. In other words, the communication interface 9 may be configured to prompt the user 1 to provide an indicating the user's emotional state or the user's current need or the user's purpose of the next trip.

Figure 2:
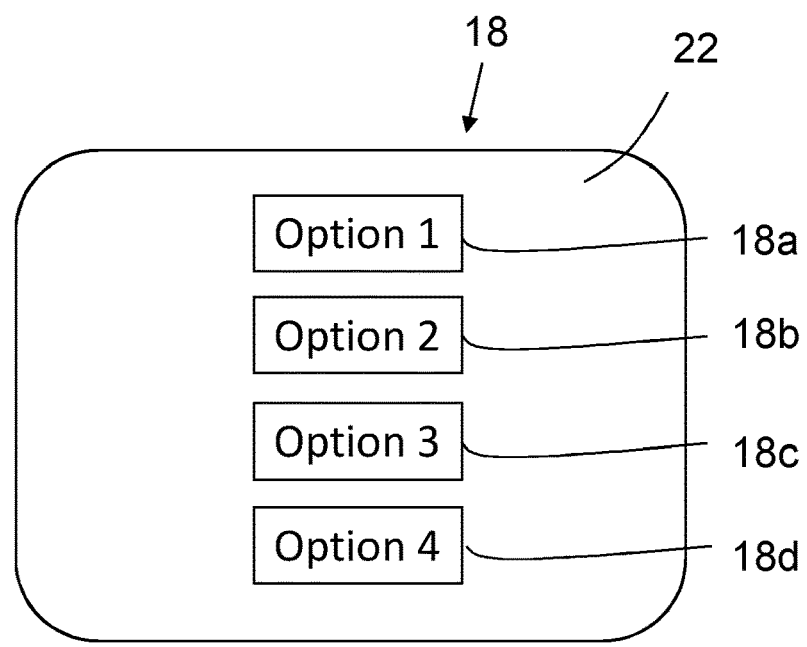
FIG. 2 is a schematic view of an example option list with four different options displayed on an electronic display.

The question may be presented to the user 1 in written form on a display of the communication interface 9, for example in form of an option list. A schematic illustration of an example option list 18 is showed in FIG. 2, wherein an electronic display 22 of the vehicle 2 shows four individual options 18a, 18b, 18c, 18d and the user 1 may select one of the options 18-18d.

Example options indicating the user's emotional state may be "Stressed", "Happy", "Romantic", "Playful", "Anxious", "Inspired", "Celebration", etc. Example options indicating the user's current need may be "Increased light", "Welcoming Exterior lighting", "Welcoming horn signaling", "Warmer", "Colder", "Navigation", "Night driving", "Day Driving", "Party atmosphere", etc. Finally, example options indicating the user's purpose of the next trip may be "Business", "Dynamic driving", "Pleasure", etc. Each option of the option list 18 is then allocated a predetermined operating characteristic of one or more vehicle features.

If the question is presented in form of an option list 18 the user may select the option of the option list 18 that best indicate the user's emotional state or current need or purpose of the next trip. Alternatively, the communication interface 9 may be configured to register a user's voice command by means of voice recognition or user's text input in the communication interface.

The communication interface 9 may include a virtual assistant that assists in input and output of information to the system of the disclosure.

After having acquired personal information indicating the user's emotional state or the user's current need or the user's purpose of the next trip, the vehicle electronic control unit 8 may finally temporarily customize the operating characteristic of the vehicle external proximity lighting based on the acquired personal information, namely by selecting a predetermined logic algorithm for controlling the vehicle external proximity lighting that results in increased illumination of the proximity area of the car 2 by activation of the first and second light sources 3, 6.

Consequently, the system and method of the disclosure provides direct means of user customization of the vehicle features, wherein "direct customization" in this context is defined as a mechanism to temporarily influence, adjust, modify, change or in other way influence the logic operating algorithm of a vehicle feature by a user input.

Importantly, the temporary customized operating characteristic of the external proximity lighting does not remain customized more than maximal a single driving cycle. In fact, the temporarily customized operating characteristic of the external proximity lighting does not need to remain in a customized state for longer than until driving off with the car, e.g. normally merely a few minutes.

The termination of the customized state may end after a certain time period, such as about 5-60 minutes starting from entering the customized state, or during about 5-15 minutes starting from entering the customized state, or after a certain event has occurred, such as driving off with the car 2.

After termination of the temporary customization the vehicle electronic control unit is configured to control the temporary customized operating characteristic of the external proximity lighting to return to an ordinary operating characteristic of the external proximity lighting.

Ordinary operating characteristic of a certain vehicle feature herein refers to a factory-set or user adjusted stationary operating characteristic of said certain vehicle feature.

If no personal information from the user indicating the user's emotional state or the user's current need or the user's purpose of the next trip was acquired in connection with the user approaching the vehicle, the vehicle electronic control unit is configured to use the ordinary operating characteristic of the external proximity lighting. In other words, if no information was acquired from the user to perform a temporary customization of the external proximity lighting the default operating setting of the external proximity lighting will be used by the electronic control unit 8.

The first vehicle feature that is temporarily customized belongs to a set of vehicle features that are associated with a vehicle welcome sequence. Hence, with reference to FIG. 1, the temporary customized operating characteristics of the external proximity lighting described above may in fact be deemed being part of a temporarily customized vehicle welcome sequence. A vehicle welcome sequence is defined by special operating characteristics of a set of a vehicle features performed only in connection with a user approaching and entering the vehicle, and a certain time period thereafter, such as about 1-10 minutes after entry or start of the vehicle.

The system and method for enabling a user to temporarily customizing an operating characteristic of a first vehicle feature according to the invention is also not limited to temporarily customizing the operating characteristic of a single vehicle feature. On the contrary, the system and method according to the disclosure typically involves temporarily customization of the operating characteristic of a plurality of vehicle features, such as including also a second, third, fourth or more vehicle features.

For example, the electronic control unit 8 may upon selecting a predetermined logic algorithm for increased illumination of the proximity area of the car 2 by activation of the first and second light sources 3, 6 be programmed to temporarily change the operating characteristic also of the interior lighting of the car, the graphical interface of the electronic displays of the car and the main light source of the head lamps 7 for adapting these vehicle features to perform better in the dark ambient surroundings of the car. Hence, the command "increased lighting" provided by the user 1 may trigger temporary customisations of several different vehicle features to provide the user with an improved experience.

Some examples of vehicle features whose operating characteristics may be temporarily customised by the system and method of the present disclosure are, with reference to FIG. 1, vehicle exterior lighting including front head lamps 7 and rear lamps 10, vehicle glass heating system of for example the front wind screen 11 and rear window 12, vehicle glass light transmission system for any of the windows 11-13.

Figure 3:
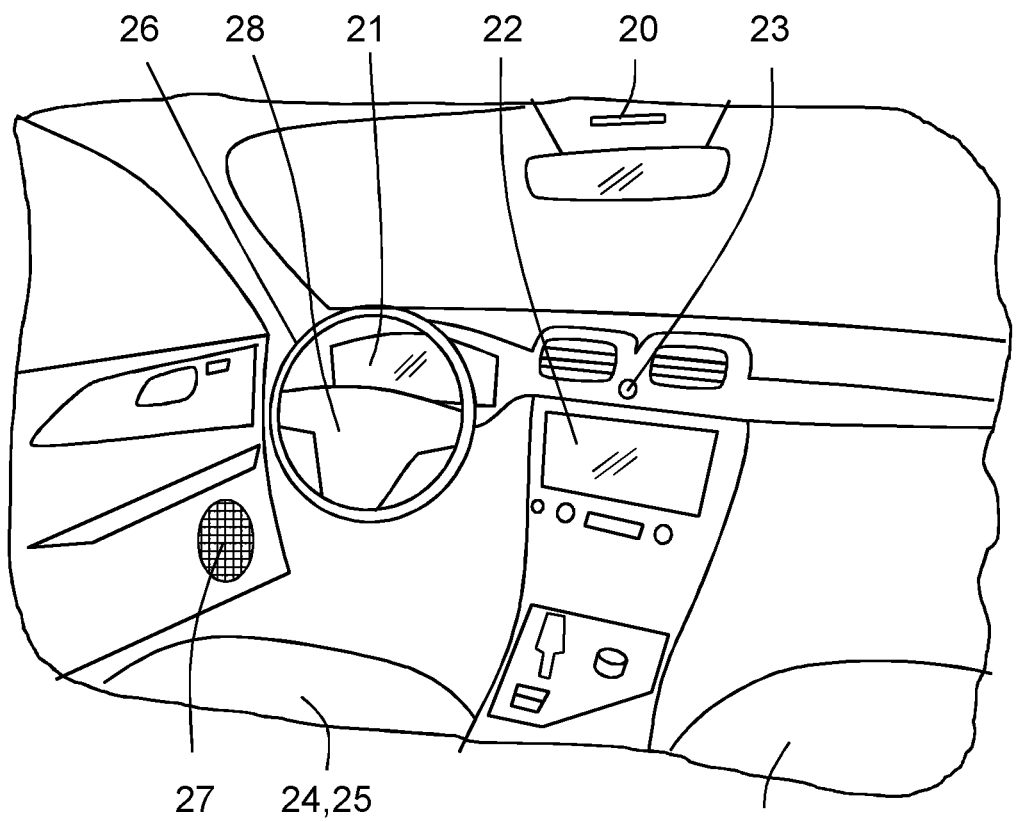
FIG. 3 is a schematic view of an interior of a vehicle with various vehicle features.

Some further examples of vehicle features whose operating characteristics may be temporarily customised by the system and method of the present disclosure are, with reference to FIG. 3 which shows a schematic illustration of the interior of the car 2, vehicle interior lighting with light source 20, graphical user interface on an instrument cluster electronic visual display 21 and central console electronic visual display 22, vehicle interior fragrance diffuser 23, vehicle seat heating system 25, vehicle steering wheel heating system 26, music play list (not showed), vehicle audio system 27 and vehicle horn 28.

Figure 4:
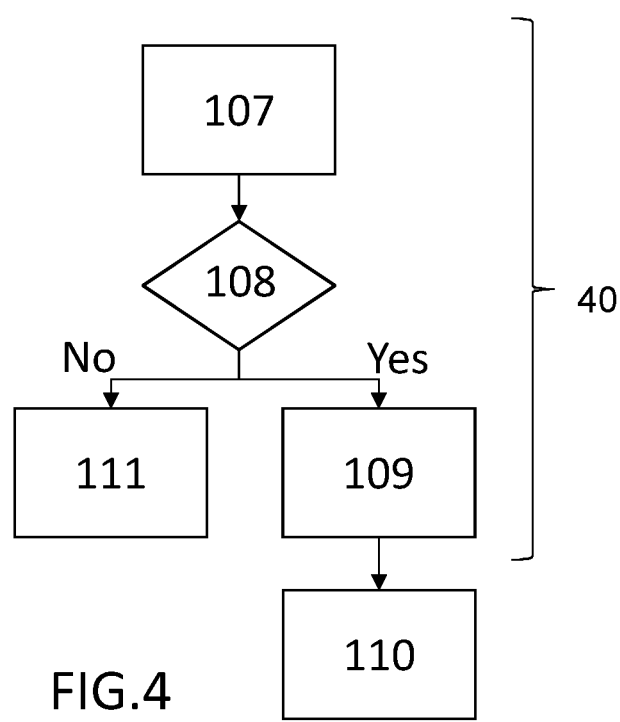
FIG. 4 is a first example embodiment of a flowchart according to the method of the disclosure.

A first example embodiment of the method for enabling a user to temporarily customize an operating characteristic of a first vehicle feature is hereinafter described more in detail with reference to FIG. 4, which schematically shows the main steps of the example embodiment.

The method comprises an information acquisition step 107, which includes acquiring personal information from the user indicating the user's emotional state or the user's current need or the user's purpose of the next trip by means of a communication interface that can communicate with a vehicle electronic control unit.

After the information acquisition step 107 the method includes performing an evaluation event 108 for determining whether any useable information was acquired, or not. Useful information is such information that enables the system to determine which vehicle feature(s) the user wants to temporarily customize and what type of temporary customization the user wants to be performed in terms of adjusted operating characteristic.

If the system determines that useful personal information is acquired from the user the method proceeds to a customization step 109 of performing the desired temporary customization of at the desired vehicle feature(s) by means of the vehicle electronic control unit based on the acquired personal information.

For example, if the system determines that the user wants to temporarily customize the vehicle welcoming sequence by increasing the exterior illumination of the area surrounding the vehicle, the electronic control unit temporarily replaces the ordinary (default) logic algorithms that controls the operating characteristics of for example the first and second light sources 3, 6 of the external proximity lighting with other predetermined logic algorithms, which involves a significantly increased light emission of said light sources 3, 6.

As clear from the example above, the vehicle electronic control unit may include or have access to a large set of predetermined logic algorithms for controlling various customizable vehicle feature, wherein each logic algorithm represents an individual operating characteristic of on individual vehicle feature. The evaluation event 108 thus involves analysing the acquired personal information from the user and assigning the acquired personal information to one of the predetermined logic algorithms for controlling the relevant vehicle feature, such that the operating characteristics of said vehicle feature may become temporarily customized by executing the assigned predetermined logic algorithms for controlling the first vehicle feature in the customization step 109.

The information acquisition step 107, the evaluation event 108 and the customization step 109 of the method are typically performed in a time period 40 stretching from shortly before the user intends to enter the vehicle until the user enters the vehicle. On other words, the temporary customization is configured to occur in connection with begin of a next trip or journey, such as a vehicle welcoming sequence. Thereby the general object of the present disclosure is accomplished by enabling a user to directly perform temporary customization of an operating characteristic of a first vehicle feature in connecting with begin of a new journey, thereby providing an improved overall user experience.

The customized predetermined logic algorithms typically includes a predetermined time period in which customized predetermined logic algorithms should remain active. For example, the customized predetermined logic algorithms may end after a certain predetermined time period after begin of the customization, or after a predetermined time period from a predetermined event, such as closing the vehicle door after entry into the vehicle, activating the electronic displays of the vehicle, starting the engine, driving off with the vehicle, or the like.

Consequently, unless the method does not acquire new personal information from the user indicating the user's emotional state or the user's current need or the user's purpose of the next trip that can be used for anew temporary customizing the first vehicle feature before the previous temporary customizing of the first vehicle feature has terminated, the temporary customizing of the first vehicle feature continues for a predetermined time period in which customized predetermined logic algorithms should remain active, and thereafter the method includes a return step 110, in which the temporary customization is terminated and the operating characteristic of the first vehicle feature returns to an ordinary operating characteristic of the first vehicle feature by means of the electronic control unit.

However, if no personal information from the user indicating the user's emotional state or the user's current need or the user's purpose of the next trip is acquired in connection with the user approaching the vehicle, for example because the user does not provide any command for performing the a temporary customization, or because the registered user command is unclear and cannot be allocated to any predetermined operating characteristic of a one or more vehicle features, the method proceeds to a no-customization step 111, which involves continued use of the ordinary logic algorithms for controlling the various vehicle features of the vehicle according to their ordinary operating characteristic.

The information acquisition step 107 described above includes acquiring personal information from a user indicating the user's emotional state or the user's current need or the user's purpose of the next trip by registering the user's response to an option list 18 provided by the communication interface. The option list 18 may for example be presented to the user in written form in an electronic display or in a natural language by means of a loudspeaker. The options of the option list 18 are typically linked in the electronic control unit with predetermined temporary customizations of predetermined sets of vehicle features.

Figure 5:
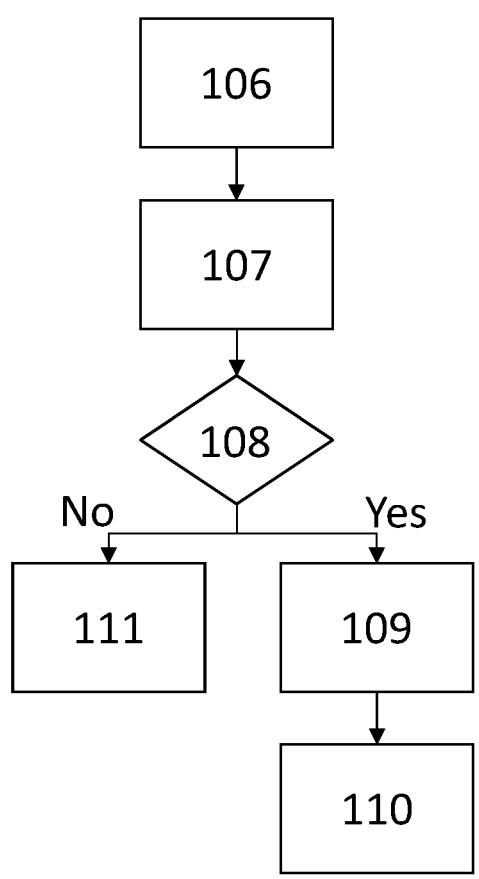
FIG. 5 is a further example embodiment of a flowchart according to the method of the disclosure.

With reference to FIG. 5, for enabling even greater user experience in connection with approaching and entering the vehicle the method may include an option list 18 adaptation step 106 that involves adapting the option list 18 provided by the communication interface based on specific circumstances at or near the time point of presenting the option list 18 to the user.

By adapting the options of the option list 18 taking into account specific circumstances the questions and options can be made more relevant to specific circumstances and thereby provide a greater experience to the user.

For example, the options of the option list 18 may be adapted based on registered vehicle ambient environmental information, such as ambient light conditions, temperature, rainfall, snowfall, thunder, wind conditions, fog, or the like. Consequently, when the electronic control unit for example registers exterior dense fog condition the options may be adapted to include "Fog driving", and should the user select/approve this proposal the electronic control unit would temporarily customise the operating characteristics of one or more vehicle features, such as for example by temporarily activating front and rear fog lamps.

Furthermore, the options of the option list 18 may alternatively, or in addition, be adapted based on registered vehicle passenger compartment environmental information, such as temperature, light conditions, solar irradiation, and humidity. Consequently, when the electronic control unit for example registers high interior temperature and high level of solar irradiation the options may be adapted to include "Shading", and should the user select/approve this proposal the electronic control unit would temporarily customise the operating characteristics of one or more vehicle features, such as for example by temporarily reducing the light transmission by means of the vehicle glass light transmission system and activating air cooling by means of an air conditioning unit.

Furthermore, the options of the option list 18 may alternatively or in addition be adapted based on environmental information at geographical position of the vehicle downloaded from an external provider. This may be used in similar fashion as described above with reference to registered vehicle ambient environmental information.

Furthermore, the options of the option list 18 may alternatively, or in addition, be adapted based on registered user input to a navigation system. For example, if the electronic control unit for example registers a navigational destination located within the same city as the vehicle's current location the question or options may be adapted to include "City driving", and should the user select/approve this proposal the electronic control unit would temporarily customise the operating characteristics of one or more vehicle features.

Furthermore, the options of the option list 18 may alternatively or in addition be adapted based on registered geographical position of the vehicle. For example, if the electronic control unit for example registers a geographical position of the vehicle in an area of poor rural or forest roads the question or options may be adapted to include "forest driving", and should the user select/approve this proposal the electronic control unit would temporarily customise the operating characteristics of one or more vehicle features.

Furthermore, the options of the option list 18 may alternatively, or in addition, be adapted based on electronic calendar information of the user, where entries such as "meeting", "holiday" or "picking up kids" may be recorded. These entries may enables the electronic control unit to adapt the options accordingly.

Furthermore, the options of the option list 18 may alternatively, or in addition, be adapted based on current date. Thereby the electronic control unit may receive an indication whether the user plans to make a journey related to work or private and adapt the options accordingly.

Furthermore, the options of the option list 18 may alternatively, or in addition, be adapted based on current time. Thereby the electronic control unit may receive an indication whether the user plans to make a journey in daytime or nighttime, or traveling to or from the work, and adapt the options accordingly.

Furthermore, the options of the option list 18 may alternatively or in addition be adapted based on personal information of the user, such as the user's or user's kids' or wife's birthday or wedding day, favourite sport team, favourite colour, favourite music, etc. The system and method may include collecting personal information of the user from an online social media or social networking service. For example, if the electronic control unit for example determines that the user plans to travel on the day of his birthday or when the favourite sports team just has won a game, the question or options may be adapted to include "Celebration", and should the user select/approve this proposal the electronic control unit would temporarily customise the operating characteristics of one or more vehicle features, such as for example special playlist and/or special graphical interface in the vehicle electronic displays.

Furthermore, the options of the option list 18 may alternatively or in addition be adapted based on a predictive statistical model of the user's behaviour. Thereby, the electronic control unit may for example determine that the user with high likelihood plans to travel to work, because statistically the user nearly always travels to work at around the specific time on workdays, the question or options may be adapted to include "Work", and should the user select/approve this proposal the electronic control unit would temporarily customise the operating characteristics of one or more vehicle features accordingly.

Figure 6:
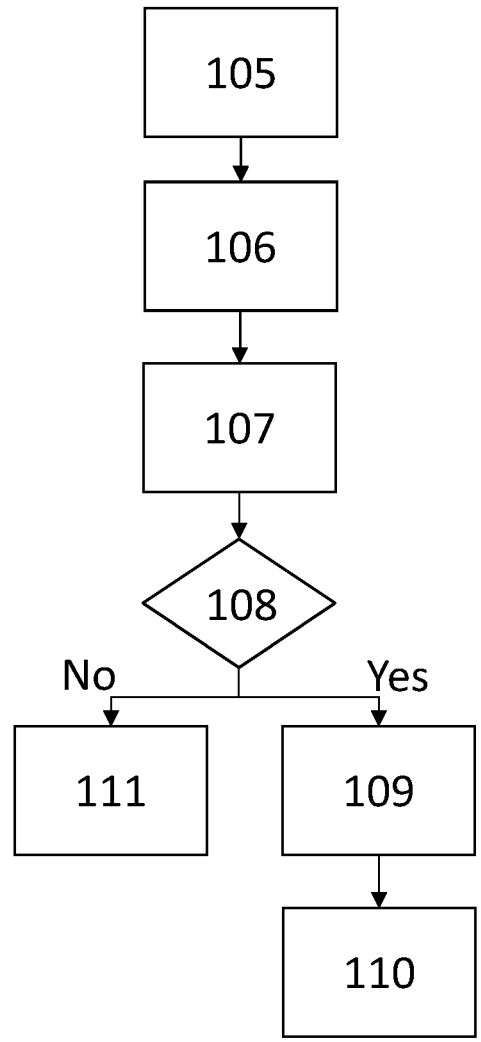
FIG. 6 is still a further example embodiment of a flowchart according to the method of the disclosure.

With reference to FIG. 6, which shows a further example embodiment of the disclosure, the method and system may additionally comprise a step 105 of acquiring information from the user about which vehicle seat the user intends to be seated in. This information may for example be collected by presenting the user with an additional question that the user must reply to, and this information is primarily relevant when activating seat heating and seat ventilation or seat massage function, since these features are seat specific.

In FIG. 6, the step 105 of acquiring user seat information is located before the question or option list adaptation step 106 and before the information acquisition step 107. However, the step 105 of acquiring user seat information may be located between steps 106 and 107, or even after step 107.

Figure 7:
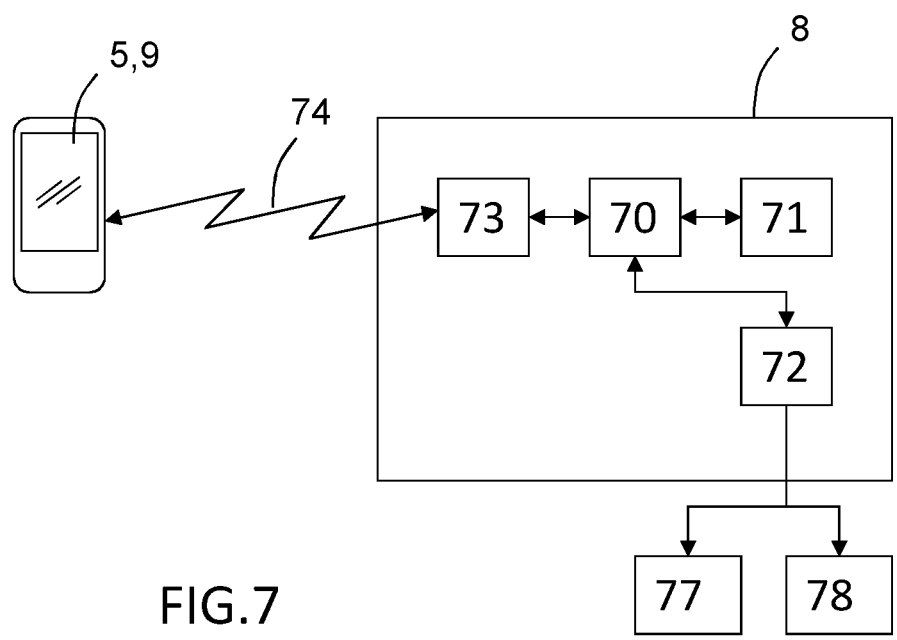
FIG. 7 is a first example embodiment of a system according to the disclosure.

FIG. 7 shows schematically an example embodiment of the system according to the disclosure. The system of FIG. 7 comprises an electronic control unit 8 installed within the vehicle 2. The electronic control unit 8 may comprise an electronic processor 70 such as a microprocessor, and data memory device 71, an input/output (I/O) port 72 and a communication port 73.

The data memory device 71 may include any non-volatile data storage device capable of storing data for use by the electronic control unit 8. The data memory device 71 may include a magnetic disk drives, optical disk drives, solid state drives, flash drives, read-only memory (ROM), random access memory (RAM), Compact Disc Read-Only Memory (CD-ROM), Digital Versatile Disc Read-Only Memory (DVD-ROM), and the like, and the data memory device 71 may include removable or non-removable data storage media. The data memory device 71 may store a finite set of predetermined logic algorithms for controlling the first or more vehicle feature.

Input/output (I/O) port 72 may be connected to one or more external electronic devices 77, 78, such as for example the first and second light sources 3, 6 of the external proximity lighting. The input/output (I/O) port 72 enables the processor 70 to control of the operating characteristics of said external electronic devices 77, 78.

The communication port 73 is configured for communicating with other computing, network, or vehicle devices, such as motor controllers and systems, battery control, fuel cell or other energy storage systems, autonomous or semi-autonomous processors and controllers, steering systems, brake systems, light systems, navigation systems, environment controls, entertainment systems, and the like.

The communication port 73 further connects the electronic control unit 8 to the communication interface 9 of the mobile device 5 by means of wireless communication network 74, such as Wi-Fi, Bluetooth. Further, the communication port 73 may communicate with an antenna (not showed) employed to receive Global Positioning System (GPS) data to facilitate determination of the location of the vehicle.

The presently described method may be implemented in software stored on the data memory device 71, information from the user 1 may be acquired via the communication interface 9 via the communication port 73 and temporary customization of the operating characteristics of the one or more external electronic devices 77, 78 may be communicated to said one or more external electronic devices 77, 78 via the I/O port 72.

Although the disclosure has been described in relation to specific combinations of components, it should be readily appreciated that the components may be combined in other configurations as well which is clear for the skilled person when studying the present application. Thus, the above description of the example embodiments of the present disclosure and the accompanying drawings are to be regarded as a non-limiting example of the disclosure and the scope of protection is defined by the appended claims. Any reference sign in the claims should not be construed as limiting the scope.

The use of the word "a" or "an" in the specification may mean "one," but it is also consistent with the meaning of "one or more" or "at least one." The term "about" means, in general, the stated value plus or minus 10%, or more specifically plus or minus 5%. The use of the term "or" in the claims is used to mean "and/or" unless explicitly indicated to refer to alternatives only.

The terms "comprise", "comprises" "comprising", "have", "has", "having", "include", "includes", "including" are open-ended linking verbs. As a result, a method or device that "comprises", "has" or "includes" for example one or more steps or elements, possesses those one or more steps or elements, but is not limited to possessing only those one or more elements.

What is claimed is:

1. A method for enabling a user to temporarily customize an operating characteristic of a first vehicle feature associated with a vehicle welcome sequence, comprising:
in connection with the user approaching the vehicle,
acquiring personal information from the user indicating at least one of the user's emotional state, the user's current need, or the user's purpose of the next trip by presenting an option list to the user by means of a communication interface that communicates with a vehicle electronic control unit and subsequently registering the user's response to said option list by means of said communication interface, wherein each option of the option list is allocated a predetermined operating characteristic of the first vehicle feature, wherein the communication interface is a mobile communication device, and wherein the method further comprises adapting the option list provided by the communication interface based on specific circumstances at or near the time point of presenting the question or option list to the user,
temporarily customizing the operating characteristic of the first vehicle feature by means of the vehicle electronic control unit based on the acquired personal information, wherein the temporary customized operating characteristic of the first vehicle feature does not remain customized more than a single driving cycle, and wherein the first vehicle feature is at least one of vehicle interior lighting, vehicle exterior lighting, graphical user interface on at least one electronic visual display, vehicle interior fragrance diffuser, music play list, vehicle horn, vehicle seat heating system, vehicle steering wheel heating system, vehicle glass heating system, or vehicle glass light transmission system, and after termination of the temporary customization controlling the temporary customized operating characteristic of the first vehicle feature to return to an ordinary operating characteristic of the first vehicle feature by means of the electronic control unit, and if no personal information from the user indicating the at least one of the user's emotional state, the user's current need, or the user's purpose of the next trip is acquired in connection with the user approaching the vehicle, using the ordinary operating characteristic of the first vehicle feature.

2. The method according to claim 1, comprising adapting the option list provided by the communication interface based on at least one of the following information sources:
registered vehicle ambient environmental information,
registered vehicle passenger compartment environmental information,
environmental information at geographical position of the vehicle downloaded from an external provider,
registered user input to a navigation system,
registered geographical position of the vehicle,
electronic calendar information of the user,
current date,
current time, or
personal information of the user.

3. The method according to claim 1, comprising adapting the option list provided by the communication interface based on a predictive statistical model of the user's behaviour.

4. The method according to claim 1, comprising acquiring information from the user indicating the at least one of the user's emotional state, the user's current need, or the user's purpose of the next trip by registering a user's voice command by means of voice recognition or user's text input in the communication interface.

5. The method according to claim 1, comprising:
providing the vehicle electronic control unit with access to a finite set of predetermined logic algorithms for controlling the first vehicle feature, wherein each logic algorithm represents an individual operating characteristic of the first vehicle feature,
analysing the acquired personal information from the user and assigning the acquired personal information to one of the predetermined logic algorithms for controlling the first vehicle feature, and
temporarily customizing the operating characteristic of the first vehicle feature by executing the assigned predetermined logic algorithms for controlling the first vehicle feature.

6. The method according to claim 1, wherein the temporarily customized operating characteristic of the first vehicle feature remains in a customized state for about 5-60 minutes starting from entering the customized state.

7. The method according to claim 1, comprising acquiring information from the user about which vehicle seats should be included in temporary customization of the operating characteristic of the first vehicle feature.

8. The method according to claim 1, further comprising temporarily customizing an operating characteristic of at least second vehicle feature by means of the vehicle electronic control unit based on the acquired personal information, wherein the temporary customized operating characteristic of said vehicle features do not remain customized more than a single driving cycle, and after termination of the temporary customization controlling the temporary customized operating characteristic of said vehicle features to return to an ordinary operating characteristic of said vehicle feature by means of the electronic control unit.

9. The method according to claim 1, wherein the temporarily customized operating characteristic of the first vehicle feature remains in a customized state for about 5-15 minutes starting from entering the customized state.

10. The method according to claim 1, wherein the temporarily customized operating characteristic of the first vehicle feature remains in a customized state until the end of the driving cycle.

11. A system for enabling a user to temporarily customize an operating characteristic of a first vehicle feature associated with a vehicle welcome sequence, the system comprises:
a vehicle electronic control unit responsible for controlling a first vehicle feature,
a mobile communication device with a communication interface that communicates with the vehicle electronic control unit,
wherein the communication interface is configured to, in connection with the user approaching the vehicle, acquire personal information from the user indicating at least one of the user's emotional state, the user's current need, or the user's purpose of the next trip by presenting an option list to the user, and subsequently registering the user's response to said option list, wherein each option of the option list is allocated a predetermined operating characteristic of the first vehicle feature, and wherein the communication interface is configured to adapt the option list provided by the communication interface based on specific circumstances at or near the time point of presenting the option list to the user,
wherein the vehicle electronic control unit is configured to temporarily customize the operating characteristic of the first vehicle feature based on the acquired personal information, wherein the first vehicle feature is at least one of vehicle interior lighting, vehicle exterior lighting, graphical user interface on at least one electronic visual display, vehicle interior fragrance diffuser, music play list, vehicle horn, vehicle seat heating system, vehicle steering wheel heating system, vehicle glass heating system, or vehicle glass light transmission system,
wherein the temporary customized operating characteristic of the first vehicle feature does not remain customized more than a single driving cycle, and
wherein the vehicle electronic control unit is configured to, after termination of the temporary customization, control the temporary customized operating characteristic of the first vehicle feature to return to an ordinary operating characteristic of the first vehicle feature, and
wherein the vehicle electronic control unit is configured to use the ordinary operating characteristic of the first vehicle feature if no personal information from the user indicating the at least one of the user's emotional state, the user's current need, or the user's purpose of the next trip is acquired in connection with the user approaching the vehicle.

\* \* \* \* \*